US006558718B1

(12) United States Patent
Evenson et al.

(10) Patent No.: US 6,558,718 B1
(45) Date of Patent: May 6, 2003

(54) NUTRIENT CLUSTERS FOR FOOD PRODUCTS AND METHODS OF PREPARATION

(75) Inventors: Keith A. Evenson, Elk River, MN (US); James R. Borek, Burnsville, MN (US); Barrie R. Froseth, Plymouth, MN (US); Daniel L. Green, Minnetonka, MN (US); Jamileh Lakkis, Minneapolis, MN (US); Bernhard Van Lengerich, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/596,543

(22) Filed: Jun. 19, 2000

(51) Int. Cl.$^7$ .............................. A23P 1/08; A23L 1/29; A23L 1/164
(52) U.S. Cl. ............................ 426/72; 426/89; 426/96; 426/99; 426/103
(58) Field of Search ........................... 426/89, 72, 96, 426/99, 103

(56) References Cited

U.S. PATENT DOCUMENTS

| | | | |
|---|---|---|---|
| 2,876,160 A | 3/1959 | Schoch et al. | |
| 3,027,102 A | 3/1962 | Lödige et al. | |
| 3,404,984 A | 10/1968 | Olsen | |
| 3,786,123 A | 1/1974 | Katzen | |
| 3,868,471 A | 2/1975 | Decelles et al. | |
| 3,922,354 A | 11/1975 | Galluzzi et al. | |
| 3,928,567 A | 12/1975 | Andersen et al. | |
| 3,962,416 A | 6/1976 | Katzen | |
| 3,992,555 A | 11/1976 | Kovacs | |
| 4,075,356 A | 2/1978 | Haag et al. | |
| 4,106,991 A | 8/1978 | Markussen et al. | |
| 4,178,392 A | 12/1979 | Gobble et al. | |
| 4,242,219 A | 12/1980 | Bogerman et al. | |
| 4,379,171 A | * 4/1983 | Furda et al. ................ | 426/291 |
| 4,532,145 A | 7/1985 | Saleeb et al. | |
| 4,689,235 A | 8/1987 | Barnes et al. | |
| 4,816,259 A | 3/1989 | Matthews et al. | |
| 4,871,574 A | 10/1989 | Yamazaki et al. | |
| 4,886,820 A | 12/1989 | Gross et al. | |
| 4,888,171 A | 12/1989 | Okonogi et al. | |
| 4,895,725 A | 1/1990 | Kantor et al. | |
| 4,999,208 A | 3/1991 | Lengerich et al. | |
| 5,009,900 A | 4/1991 | Levine et al. | |
| 5,023,083 A | 6/1991 | Drell | |
| 5,071,668 A | 12/1991 | van Lengerich et al. | |
| 5,074,902 A | 12/1991 | Connick, Jr. et al. | |

(List continued on next page.)

FOREIGN PATENT DOCUMENTS

| | | |
|---|---|---|
| DE | 37 38 042 A | 5/1988 |
| DE | 40 21 678 | 1/1992 |
| EP | 33662 A | 10/1969 |
| EP | 223 963 A | 6/1987 |
| EP | 391518 A | 10/1990 |
| EP | 0 462 012 A2 | 12/1991 |
| EP | 0 465 364 A1 | 1/1992 |
| EP | 552057 A | 7/1993 |
| EP | 603992 A1 | 6/1994 |
| EP | 605913 A | 7/1994 |
| EP | 1 064 856 A2 | 1/2001 |
| EP | 1 066 761 A2 | 1/2001 |
| EP | 1 118 274 A | 7/2001 |
| FR | 2 640 472 A | 6/1990 |
| GB | 15312 | of 1911 |
| GB | 1 437 501 A | 5/1976 |
| JP | 47014316 A | 10/1972 |
| JP | 59139317 A | 8/1984 |
| JP | 1313421 A | 12/1989 |
| JP | 6024962 A | 2/1994 |
| JP | 2000139372 A | 5/2000 |
| WO | 85/04074 | 9/1985 |
| WO | WO 88/01512 A | 3/1988 |
| WO | WO 91 03940 | 4/1991 |
| WO | 92/00130 | 1/1992 |
| WO | 92/00140 | 1/1992 |
| WO | 92/12645 | 8/1992 |
| WO | 94/23593 | 10/1994 |
| WO | 95/00121 | 1/1995 |
| WO | 95/18544 | 7/1995 |

(List continued on next page.)

OTHER PUBLICATIONS

Per Artusson et al., "Characterization of Polyacryl Starch Microparticles as Carriers for Proteins and Drugs," *Journal of Pharmaceutical Science*, vol. 73, No. 11, pps. 1507–1513 (Nov. 1984).

Lennart Randen et al., "Coprecipitation of Enzymes with Water Soluble Starch—An Alternative to Freeze–drying," *J. Pharm. Pharmacol.*, vol. 40, pps. 763–766 (1988).

(List continued on next page.)

*Primary Examiner*—Helen Pratt
(74) *Attorney, Agent, or Firm*—John A. O'Toole; Douglas J. Taylor; Barry I. Hollander

(57) ABSTRACT

Nutrient clusters for food products such as for addition to Ready-To-Eat cereals by providing, in a preferred form of the present invention, nutrient products such in the form of aggregates or clusters comprising a first particulate component; a nutrient powder blend, and sufficient binder to adhere the powder to the particulates. The nutrient clusters are in the form of pieces each weighing from about 0.3 to 5 g. and having a moisture content of about 2% to 10%. Disclosed are methods of preparing such nutrient clusters involving applying a liquid binder to the particulates to form sticky particulates, adding a powdered nutrient blend and curing the mixtures to form hardened dried nutrient clusters. The nutrient cluster can contain 100% US recommended daily allowance ("USRDA") of essential vitamins and minerals and can contain added macronutrients such as soy proteins, soluble fiber, and/or calcium in nutritionally dense form in as little as 5 to 15 g of nutrient clusters. The clusters find particular suitability for use in providing to-order customized cereal products in response to particular customer requirements for nutrition.

59 Claims, No Drawings

U.S. PATENT DOCUMENTS

| | | |
|---|---|---|
| 5,075,058 A | 12/1991 | Chan et al. |
| 5,079,012 A | 1/1992 | Lengerich et al. |
| 5,087,461 A | 2/1992 | Levine et al. |
| 5,118,513 A | 6/1992 | Mehansho et al. |
| 5,183,690 A | 2/1993 | Carr et al. |
| 5,296,000 A | 3/1994 | Darmont et al. |
| 5,320,669 A | 6/1994 | Lim et al. |
| 5,431,929 A | 7/1995 | Yatka et al. |
| 5,458,823 A | 10/1995 | Perkins et al. |
| 5,466,460 A | 11/1995 | McMahon et al. |
| 5,514,387 A | 5/1996 | Zimmerman et al. |
| 5,567,730 A | 10/1996 | Miyashita et al. |
| 5,597,416 A | 1/1997 | Fuisz et al. |
| 5,683,720 A | 11/1997 | Myers et al. |
| 5,744,180 A | 4/1998 | Cherukuri et al. |
| 5,750,104 A | 5/1998 | Sipos |
| 5,820,903 A | 10/1998 | Fleury et al. |
| 5,851,553 A | 12/1998 | Myers et al. |
| 5,862,998 A | 1/1999 | Bogue et al. |
| 5,894,029 A | 4/1999 | Brown et al. |
| 5,902,617 A | 5/1999 | Pabst |
| 5,939,127 A | 8/1999 | Abboud |
| 5,952,033 A | 9/1999 | Anantharaman et al. |
| 5,958,502 A | 9/1999 | Fulger et al. |
| 5,972,373 A | 10/1999 | Yajima et al. |
| 5,972,395 A | 10/1999 | Saleeb et al. |
| 5,972,404 A | 10/1999 | van Lengerich |
| 5,972,415 A | 10/1999 | Brassart et al. |
| 5,976,603 A | 11/1999 | Kota et al. |
| 6,004,594 A | 12/1999 | van Lengerich |
| 6,008,027 A | 12/1999 | Langner |
| 6,024,994 A | 2/2000 | Jacobson et al. |
| 6,048,551 A | 4/2000 | Amidon et al. |
| 6,149,965 A | 11/2000 | van Lengerich et al. |
| 6,168,811 B1 | 1/2001 | Clark et al. |
| 6,174,553 B1 * | 1/2001 | Certa et al. ............ 426/96 |
| 6,190,591 B1 | 2/2001 | van Lengerich |
| 6,242,033 B1 * | 6/2001 | Sander ............ 426/559 |
| 6,261,613 B1 | 7/2001 | Narayanaswamy et al. |
| 6,284,268 B1 | 9/2001 | Mishra et al. |
| 6,342,257 B1 | 1/2002 | Jacobson et al. |
| 6,368,621 B1 | 4/2002 | Engel et al. |
| 6,436,453 B1 | 8/2002 | van Lengerich et al. |
| 6,468,568 B1 | 10/2002 | Leusner et al. |
| 2001/0044026 A1 | 11/2001 | Vaghefi et al. |

FOREIGN PATENT DOCUMENTS

| | | |
|---|---|---|
| WO | 95/26752 | 10/1995 |
| WO | WO 96/09773 | 4/1996 |
| WO | WO 96/14058 | 5/1996 |
| WO | 97/16076 | 5/1997 |
| WO | WO 97/38016 A | 10/1997 |
| WO | 97/39116 | 10/1997 |
| WO | WO 98/02148 A | 1/1998 |
| WO | WO 98/09981 A | 3/1998 |
| WO | 98/18610 | 5/1998 |
| WO | WO 98/35704 A | 8/1998 |
| WO | WO 98/50019 A | 11/1998 |
| WO | 98/54980 | 12/1998 |
| WO | WO 98/58642 A | 12/1998 |
| WO | WO 99/11242 A1 | 3/1999 |
| WO | WO 99/20745 A1 | 4/1999 |
| WO | 99/23896 | 5/1999 |
| WO | 99/34688 | 7/1999 |
| WO | WO 99/45904 A1 | 9/1999 |
| WO | 99/48372 | 9/1999 |
| WO | WO 99/56563 | 11/1999 |
| WO | WO 99/61002 A1 | 12/1999 |
| WO | 99/65336 | 12/1999 |
| WO | 00/21504 | 4/2000 |
| WO | WO 00/41740 A2 | 7/2000 |
| WO | WO 00/64436 A1 | 11/2000 |

OTHER PUBLICATIONS

Shigeaki Maruo et al., "Effects of Moranoline, 4–O–α–D–Glucopyranosylmoranoline and Their N–Substituted Derivatives on Thermostability of Cyclodextrin Glycosyltransferase, Glucoamylase, and β–Amylase," *Biosci. Biotech. Biochem.*, vol. 57, No. 8, pps. 1294–1298, (1993).

Wendell Q. Sun et al., "Protein stability in the amorhous carbohydrate matrix: relevance to anhydrobiosis," *Biochimica et Biophysica Acta*, vol. 1425, pps. 245–254 (1998).

Colonna et al., "Extrusion Cooking of Starch & Starchy Products," *Extrusion Cooking*, C. Mercier, et al. AACC, St. Paul, MN (1989), pps. 247–319.

Meuser et al., "A Systems Analytical Approach To Extrusion," *Food Extrusion Science & Technology*, ed. J. Kokini, Dekker Publ. (1992), pps. 619–630.

Brochure entitled "Innovate With Raftiline®," Orafti Active Food Ingredients, Nov. 1996.

"Inulin–A 'Good–for–you' Fat Replacer, Texture Modifier," *Food Formulating*, p. 15, Feb. 1997.

Brighenti, F., et al., "One Month Consumption of Ready–to–eat Breakfast Cereal Containing Inulin Markedly Lowers Serum Lipids in Normolipidemic Men,", from: Proceedings of 7th FENS European Nutrition Conference, Vienna, 1995.

Silva, R., "Use of Inulin as a Natural Texture Modifier," *Cereal Foods World*, Oct. 1996, vol. 41, No. 10, pps. 792–794.

Niness, "Breakfast Foods and the Health Benefits of Inulin and Oligofructose", *Cereal Foods World*, vol. 44, No. 2, Feb. 1999, pp. 79–81.

Perry's Chemical Engineers' Handbook, Sixth Edition, "Screening", p. 21–15.

* cited by examiner

NUTRIENT CLUSTERS FOR FOOD PRODUCTS AND METHODS OF PREPARATION

FIELD OF THE INVENTION

The present invention relates to food products and to their methods of preparation. More particularly, the present invention relates to nutrient clusters comprising vitamin and mineral fortifiers and macronutrients that are especially useful for blending with Ready-To-Eat Cereals and to their methods of preparation.

BACKGROUND OF THE INVENTION

The present invention provides an improvement in nutritionally fortified Ready-To-Eat cereals ("R-T-E"), to nutritionally fortified clusters useful as additives for adding to R-T-E cereals, and to methods of preparing such additives and to methods of preparing fortified R-T-E cereals.

Of course, R-T-E cereals provide a baseline of nutrition provided by the native level of vitamins, minerals, fiber, etc. provided by conventional grain materials from which such R-T-E cereals are typically prepared. To increase the nutrition level of cereals above the base line provided by cereal ingredients, R-T-E cereals have long been nutritionally fortified with added micronutrients such as vitamins and certain trace elements and macronutrients such as minerals (e.g., calcium), soluble fiber, insoluble fiber, or soy protein. By micronutrients are meant materials added at levels of less than 1% (including any carriers or encapsulants). In contrast, macronutrients are materials added at levels of 1% or greater.

Conventionally, both micronutrients such as supplemental vitamins and trace minerals and macronutrients such as added fiber have been incorporated into the cooked cereal dough from which such R-T-E cereals have been prepared. These nutritionally fortifying ingredients have been blended together with the other dry ingredients, and cooked with moisture, formed into a cooked cereal dough, formed into pieces, and finished dried to form dried ready-to-eat cereals. For heat sensitive materials such as certain heat sensitive vitamins that degrade during the cooking operation, these materials can be added later in the cereal preparation such as being topically applied to formed and dried pieces.

Some consumers desire R-T-E cereals with particular vitamin and mineral fortification levels. For example, a whole-wheat cereal marketed under the WHEATIES® trademark may contain up to 25% of the recommended daily allowance for several vitamins per serving size (typically about 30 grams). However, a similar whole-wheat based flaked product marketed under the TOTAL® brand is fortified with 100% of the US recommended daily allowance (USRDA) of these and additional vitamins in a 30 g serving. More recently, these whole-wheat flakes have been improved to additionally contain 100 percent of the recommended daily allowance of calcium. Other R-T-E cereal products such as those intended for consumption primarily by children may contain 100% of the recommended daily allowance of calcium but lesser amounts (e.g., 25% USRDA) of other vitamins.

Typically, in response to consumer demands for R-T-E cereal products of varying vitamin and mineral content, cereal manufactures have introduced a variety of new products or line extensions of old products that contain various levels of vitamins and minerals. These products are typically mass-produced and distributed nationally. The proliferation of such products variations greatly increases the cost and complexity of providing R-T-E cereals to the producer and the grocery retailer such as by increasing inventory, shortening production runs, requiring customized packaging with particular nutritional labeling, more advertising, increasing the demand for grocery shelf display space, etc. Often, consumers are confused by differences in products that look and taste the same but vary in levels of nutritional fortification. Comparisons among competing products are also difficult since each producer may choose a different portion size of product for nutrition information.

However, recent consumer trends indicate consumer interest in consumer customized R-T-E cereal products. Rather than a consumer going to a grocery store and selecting from among over 200 varieties of R-T-E cereals that are typically carried a conventional grocery store, it would be desirable for the consumer to order R-T-E cereal customized to his/her particular taste and/or nutritional requirements whether at a retail store, by mail order, over the Internet or otherwise. (See for example, U.S. S No. 60/181,282 entitled "Customized Food Selection, Ordering And Distribution System And Method" (filed Feb. 9, 2000 by Barrie Froseth and Paul Muller) and which is incorporated herein by reference. For example, a male consumer might desire an R-T-E cereal comprising whole-wheat flakes having high levels of calcium, soy protein, and other vitamins but specifically not including iron while a female might desire essentially the same cereal but with high levels of iron fortification. The female consumer might further request that 100% of the USRDA for calcium be provided in a 30 g portion of this flaked cereal while the male, having a heartier appetite, in a 50 g portion. Another time, the consumer might desire the same product but additionally comprising raisins yet nonetheless providing the same level of particular micronutrients and macronutrients in the same potion size and form (e.g., whole wheat flakes).

Heretofore, there has not been any technique for providing individualized R-T-E cereals characterized by very particular levels of individual micronutrient and macronutrient levels.

Another problem in delivering higher levels of both vitamin and mineral fortification resides in the potential for adverse taste and texture effects resulting from such additions. While low levels of one vitamin might not adversely affect flavor, color or texture, the desire to provide the entire USRDA of a particular vitamin or mineral in a small quantity of R-T-E cereal greatly increase the likelihood of an adverse impact. For example, the current 100% USRDA for calcium is 1000 mg per day. To provide that level of calcium in 30 g of cereal might require calcium ingredient levels of 6–15% depending upon calcium material employed. Providing R-T-E cereal products containing 100% USRDA levels of calcium in addition to other desired fortifiers including additional minerals, vitamins and various macronutrients such as soy and fiber all within a mere 30 g of R-T-E cereal is a formidable challenge. Making such a powerfully fortified R-T-E cereal product not only palatable but sufficiently pleasing to compete with other tasty unfortified R-T-E cereals already familiar to consumers is even more challenging. Providing a technique for accomplishing high levels of fortification in an organoleptic appealing yet familiar product yet non-the-less customized to individual consumer's orders that vary from order to order has been previously unthinkable.

Still another problem in providing such highly fortified R-T-E cereals resides in the physical form of the various vitamins, minerals and macronutrients. Such materials may be in the form of liquids, powders, and particulate pieces of various sizes. Topically applying a mixture of such heterogeneous mixtures in amounts sufficient to provide high levels of fortification might not be practical and yet maintain the basic shape identity, e.g., a flaked cereal, of the finished product.

Further complicating the difficulties of formulating calcium fortified food products is that calcium-containing materials have their own particular, frequently undesirable taste properties. Worse, calcium can also interact with other ingredients, particularly flavors, to reduce desired flavors or to generate undesired off flavors especially over extended times at room temperature storage.

In view of the state-of-the-art, there is a continuing need for new and useful nutrient food products that provide high levels of fortification of vitamins, minerals, and macronutrients. Accordingly, an object of the present invention is to provide nutrient clusters that provide high levels of vitamin, mineral and macronutrient fortification.

A further object of the present invention is to provide nutrient clusters suitable for use for blending with conventional R-T-E cereal products and to provide blended nutritionally fortified ready cereal products characterized by not only high levels of nutrient fortification but also by good taste and texture attributes.

In it is still another object of the present invention to provide nutrient clusters providing higher levels of nutrient fortification that are suitable for use for consumption as a R-T-E cereal or snack product by themselves.

Still another object of the present invention is to provide additives for R-T-E cereals that provide high levels of nutrition that can be blended with conventional R-T-E cereal pieces but which do not compromise the product identity of the blended R-T-E cereal products.

Still another object of the present invention is to provide convenient, practical, economic, and simple methods for customized preparation of nutritionally fortified ready the eat cereals in response to individual consumer selection of particular types in levels of nutritional fortification.

It is a further object of the present invention to provide nutrient additives for R-T-E cereal products having improved organoleptic properties.

In particular, it is an object of the present invention to provide methods for preparing calcium fortified nutrient additives for R-T-E cereal products having improved organoleptic properties.

Still another object of the present invention is to provide methods for fortified sweetened dried fruit products wherein the calcium is supplied by insoluble calcium salts such as calcium phosphates.

It has been surprisingly discovered that the above objectives can be realized and superior heterogeneous nutritionally fortified clusters, comprising a first particulate component; a nutrient powder blend, and sufficient binder to adhere the powder to the particulates. The present invention further provides novel methods of preparation of such heterogeneous nutrient cluster products involving coating particulates, particularly those bearing higher levels of macronutrients, with a quantity of liquid binder that can contain within the binder dissolved or dispersed nutrients to form sticky binder coated particulates and then coating the binder coated particulates with a dry nutrient powder blend to form a nutrient cluster in the form of pieces and thereafter curing nutrient clusters to solidify the liquid binder to form the present dried solid nutrient clusters.

The present nutritionally fortified clusters are particularly suitable for blending with an R-T-E cereal base to form a finished R-T-E cereal product or for consuming alone as a snack food or as a ready-to-eat breakfast cereal. The R-T-E cereal base can be of conventional cereal pieces or can include fortified pieces.

Of course, R-T-E cereal products comprising blends of R-T-E cereals and unfortified clusters have been sold for many years. For example, an R-T-E cereal available under the Honey Nut Clusters® mark comprises sugar-coated flakes from cooked cereal doughs blended with clusters. The unfortified clusters comprise various cereals and nut particles held together with a sugar binder or matrix material. However, these clusters are formulated and made for taste and texture attributes rather that for providing higher levels of vitamin and mineral fortification although, of course, some nutrition is provided from the ingredients from which the clusters are prepared. It is a surprising and inventive aspect of the present invention that cluster particulate additives and techniques for preparing such additives can be simply modified to provide the present fortified nutrient clusters.

SUMMARY OF THE INVENTION

Surprisingly, the above need, objects and other aims can be satisfied in the field of nutrient clusters for food products such as for addition to ready eat cereals by providing, in a preferred form of the present invention, nutrient products such in the form of aggregates or clusters comprising a first particulate component; a nutrient powder blend, and sufficient binder to adhere the powder to the particulates. The nutrient clusters are in the form of pieces each weighing from about 0.1 to 5 g., preferably about 0.3 to 5 g., and more preferably about 0.3 to 2.5 g. and having a moisture content of about 4% to 10%. The particulates can be selected from the group consisting of dried cooked cereal grain pieces, texturized vegetable protein, dried cooked cereal dough pieces, nut meat pieces, dried fruit, legumes, fruit pastes and mixtures thereof, said particulates having a piece count of about 500 to 15,000/pound.

In its method aspect, the present invention resides in methods of preparing the nutrient clusters. The present methods essentially comprise the steps of:

(A) coating particulates with a quantity of liquid binder to form a sticky binder coated particulates, said particulates selected from the group consisting of dried cooked cereal grain pieces, texturized vegetable protein, dried cooked cereal dough pieces, nut meat pieces, dried fruit, legumes, fruit pastes and mixtures thereof, said particulates having a piece count of about 500 to 10,000/pound;

(B) coating the binder coated particulates of step (A) with a dry nutrient powder blend to form a nutrient cluster in the form of pieces each weighing about 0.3 to 5 g (dry weight basis);

(C) curing nutrient clusters to solidify the liquid binder to form dried solid nutrient clusters having a moisture content of about 2% to 10%.

DETAILED DESCRIPTION OF THE INVENTION

The present invention provides nutritionally fortified or nutrient clusters comprising micronutrients such as vitamins and minerals and macronutrients that are especially useful for blending with R-T-E cereals and further provides methods for preparing such nutrient clusters. Each of these components as well as product properties, preparation and use are described in detail below.

Throughout the specification and claims, percentages are by weight and temperatures in degrees Centigrade unless otherwise indicated.

Particulate Ingredients

The present fortified nutrient clusters essentially comprise at least one particulate ingredient. The particulate ingredients are useful to provide high levels of macronutrients such as soy proteins, fiber, calcium, lipids, and other protein sources in an organoleptically acceptable form. Optionally, a portion of one or more micronutrients such as vitamins, minerals, trace elements can be included into the particulates. Suitable particulate ingredients can be selected from the group consisting of dried cooked cereal grain pieces, texturized vegetable protein, dried cooked cereal dough pieces, nut meat pieces, dried fruit, and mixtures thereof.

Dried cooked grain pieces can include heat or steam treated grain flakes, e.g. quick oats or baby oats (i.e., small pieces of flaked oats groats) even though not fully gelatinized. Texturized vegetable protein can be provided from soy flour, soy protein, soy protein isolate, peanut flour, and mixtures. The dried cooked cereal dough pieces can be from puffed or unpuffed cooked cereal doughs. The cooked cereal dough pieces are especially desirable in that the dough formulation can be selected to provide a wide variety of flavors, textures, colors and ingredients. For example, the cooked cereal dough pieces provide a convenient mechanism for including legumes such as the pea flour, as well as for soy flour, soy protein, soy protein isolate. The cooked cereal dough can be formulated to comprise soluble fiber provided from such materials as beta glucan, oat bran, guar gum, Psyllium, fructooligosaccharides such as inulin and mixtures thereof and/or insoluble fiber such as from bran or carboxy methylcellulose. Preferred for use herein are particulates fabricated from puffed cooked cereal doughs having a density of about 0.1 to 0.4 g/cc. in view of the crisp texture provided to the present nutrient clusters.

Particulate nut ingredient or nut pieces can be provided from nut meal and/or nut particles of any of the commonly available nuts. Exemplary nut meals or nut particles can be provided from the nut meats of any commonly used nut including, for example, almond, Brazil, Coconut, hazelnut, Macadamia, peanuts, pecan, walnut, and mixtures thereof. Particularly suitable for use herein are Brazil nut pieces since such nuts are naturally high in selenium. In addition, soy nut pieces are a desirable particulate ingredient because they are a rich source of protein and phytonutrients, i.e. phytoestrogens.

The particulates can be provided by dried fruit pieces. The dry fruit pieces have a water activity ranging from about 0.25 to 0.85, preferably about 0.35 to 0.5. The particulates ingredient can comprise a dried fruit piece or bit from any dried fruit, fruit piece or fabricated fruit piece generally used in preparing snack foods and breakfast cereals. Examples of such fruits include raisins, prunes, cherries, apples, pineapple, watermelon, cantaloupe, figs, bananas, dates, currants, apricots, dried cranberries or "craisins", and mixtures thereof. Preferred for use herein as the fruit core pieces are raisins, apricots, apples and mixtures thereof. The most highly preferred dried fruits are raisins. The fruit piece can also be a fabricated fruit piece prepared from a dried fruit puree. Such fabricated puree pieces provide great flexibility of sources and blends of fruit materials as well as incorporation therein of macronutrients such as calcium and fiber. In less preferred embodiments, the fruit can comprise simulated dried fruits prepared from fruit flavored dried gum gels.

The particulates can also be defined importantly in size and desirably are characterized by piece counts ranging from about 500 to 15,000 per pound, preferably about 1000 to 5000 per pound. The particulates generally have a particle size of about U.S. Standard Size No. 20 to 5/16 mesh (0.841 to 8 mm). Particle sizes greater than about U.S. Standard Size No. 5/16 mesh (>8 mm) may be difficult to adhere to form the present nutrient clusters.

The present nutrient clusters essentially can comprise about 20% to 85% by weight of the cluster of the particulate ingredient(s), preferably about 55% to about 70%, and for best results about 60% to about 65%. Of course the particular level of particulates will depend in part upon such considerations as desired selection of and levels of particular micronutrients and macronutrient, and desired taste and texture attributes.

Nutrient Powder Ingredients

The present nutrient clusters further essentially comprise a nutrient powder blend that includes at least two micronutrients. In a preferred embodiment, at least one of the micronutrients is encapsulated. Micronutrients can be selected from vitamins, trace elements, nutraceuticals, red rice yeast (a source of cholesterol reducing statins), prebiotics, probiotics, isoflavones, phytochemicals, and mixtures thereof.

Preferably at least some one, preferably most of the micronutrients are encapsulated. Encapsulation helps to protect and preserve the micronutrient as well mask any off-flavor from the micronutrients. Generally, encapsulated micronutrient comprise about 20% to 80% encapsulating material and about 20% to 80% encapsulated material. The encapsulating material can be a starch, sugar(s), fat, protein (e.g., gelatin), non-fat dry milk solids, or mixtures thereof. Encapsulated micronutrients are widely commercially available and the skilled artisan will have no difficulty in selecting and obtaining a wide variety of micronutrients.

Frequently, blends are provided commercially such as a blend of B vitamins such as Vitamin $B_1$, (thiamin), Vitamin $B_2$ (Riboflavin), Vitamin $B_3$, Vitamin $B_6$, vitamin $B_{12}$ (cyanocobalamin), Pantothemic acid, niacin, thiamin. The micronutrients can further include typical vitamins as Vitamin A, Vitamin D, Vitamin E, Thiamin, Riboflavin, Niacin, Pyridoxine, Pantothenic Acid, Cyanocobalamin, Folic Acid, and Biotin.

In other variations, the micronutrients can include trace elements and minerals such as copper, iron, selenium, magnesium, manganese, zinc, and mixtures thereof. Conventional ingredients for vitamins and minerals can be employed to provide the desired trace elements. For example, Iron can be provided by reduced iron, iron sulfite, ferric sodium pyrophosphate, and/or iron fumarate. Copper can be provided by $Cu_2O$, $CuCl_2$, CuSO4 and mixtures thereof. Magnesium can be provided by MgO, $MgCl_2$, MgCO2, $Mg(OH)_2$, Magnesium acetate and mixtures thereof. Zinc can be provided by, for example Zn-citrates, Zn-gluconates, Zn-stearates, Zn-amino acid chelates, Zn-ascorbates, and mixtures thereof.

In preferred embodiments, the nutrient blend comprises sufficient amounts of vitamin and trace elements to provide 100% USRDA for all essential vitamins and minerals in less than about 5 to 15 g of nutrient clusters, preferably in about 5 to 12 g of nutrient clusters. Provision of such highly fortified materials allows for small levels of addition of the present nutrient clusters, e.g., 5 g, to small quantities of conventional cereal products e.g., 25 g, to provide cereal with-nutrient cluster blends having 100% USRDA of multiple vitamins, minerals and macronutrients.

In a preferred embodiment, the nutrient powder blend further comprises one or more macronutrients in powder form especially including calcium (e.g., from $CaCO_3$, calcium citrate, calcium lactate, calcium phosphate salts, $CaCl_2$, and mixtures thereof. In one preferred embodiment, at least a portion of the calcium is provided by calcium that is encapsulated in inulin as is described in commonly assigned copending U.S. Ser. No. 09/595,244 entitled "Oligosaccharide Encapsulated Mineral and Vitamin Ingredients" filed Jun. 16, 2000 by Steven J. Leusner, Jamileh Lakkis, Bernhard H. van Lengerich, Thomas Jarl and/or as described in U.S. Ser. No. 09/595,121 entitled "Production of Oil Encapsulated Minerals and Vitamins In a Glassy Matrix" filed Jun. 16, 2000 by Bernhard H. van Lengerich and Jamileh Lakkis, each of which is incorporated herein by reference. This powdered calcium-in-inulin material provides the further advantage of providing two macronutrients, calcium and soluble fiber in the form of inulin, in a single ingredient. In one embodiment, 1000 mg of calcium is provided in about 5 to 15 g of nutrient clusters. Thus, the nutrient clusters are further characterized by a calcium content of about 0.065% to 30%.

Especially preferred for use herein to provide the desired levels of calcium is calcium phosphate. Calcium phosphate is generally available as a monobasic $(CaH_4(PO_4)_2 \cdot H_2O)$, dibasic $(CaHPO_4 \cdot 2H_2O)$ or tribasic $(Ca_3(PO_4)_2)$ salts. Preferred for use herein is tricalcium phosphate, $Ca_3(PO_4)_2$, ("TCP") because of its high weight percentage of calcium (about 38%). Moreover, TCP is slightly more soluble than other calcium phosphate salts.

A useful tricalcium phosphate starting material is also known as tribasic calcium phosphate or tricalcium orthophosphate and is commercially available in food chemicals codex grade from Monsanto or Rhone Poulenc, having the general formula $3Ca_3(PO_4)_2 \cdot Ca(OH)_2$. This product provides assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also commercially available from Stauffer Chemicals in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

Most importantly, the calcium material such as calcium carbonate and/or calcium phosphate salt has a particle size such that 90% has a particle size of less than 150 microns ("$\mu m$"), that is, a fine powder. Having a calcium phosphate being of sufficiently reduced particle size is to avoiding a "grittiness" organoleptic attribute in the finished dried fruit composition. Preferably, the calcium material has a particle size of less than 100 microns.

Calcium phosphate salts are a preferred source of calcium, not only because of their acid solubility and weight ratios, but also because they are available commercially as a precipitate from whey, a natural dairy product.

The nutrient powder blend is further characterized by a smaller particle size. Preferred for use herein are powders having a particle size of about 1 to 1000 microns, preferably about 1 to 250 microns and for best results about 5 to 100 microns.

Binding Agent

The present fortified food products further essentially comprise sufficient amounts of a binding agent to bind together the particulate ingredients with the nutrient powder blend to form the present nutrient clusters. The particular binding agent(s) usage level depends upon a variety of factors such as the desired textural properties in the finished product. Generally, however, good results are obtained when the nutrient clusters comprise about 15% to about 40% of the binder(s).

The art is replete with suitable binding agents and the skilled artisan will have not difficulty in selecting suitable binding (s) for use herein. Solutions or slurries can be prepared wherein various gums (e.g., guar, pectin, carragenan, xanthan, gellan, carboxy methylcellulose), proteins, (e.g., gelatin, soy proteins, egg whites, hydrolyzed soy proteins), starches (e.g., Pregelatinized, modified starches) are used as the binding agent. Preferred for use herein as the binding agents are nutritive carbohydrate sweetening agents (sucrose, dextrose, corn syrup, honey, fruit juices.

The binder is usually applied dissolved or dispersed in liquid form. Added moisture is then removed by drying as described below.

Certain binder embodiments can additionally comprise a fat (oil and/or solid) component. The fat component additionally affects the eating qualities of the present compositions. The fat ingredient can also assist in minimizing interaction between any oil soluble flavors included and the insoluble calcium ingredient. For fat bearing binders, the binder is provided with liquid oil or fat heated to above its melting point.

The fat can comprise preferably about 0.1 to 50%, more preferably 0.5 to 30% and for best results about 0% to about 20% of the nutrient cluster. Useful herein are fats and oils that are conventional for use in food products, especially for confections. Both conventional fatty triglyceridic materials such as oils and solid fats can be used herein as well as blends of fats and oils or fats and sugars, that is compound coatings, or white chocolate. Also useful herein are fats, especially partially hydrogenated oils such as canola, corn oil, safflower, soybean, coconut, cottonseed or fractionated oils, all of which have melting points above room temperature. Less preferred are animal derived fats. Employment of such particular fats is preferred due to a reduced tendency of the glyceridic component to grease out of the present fruit compositions. In other preferred variations, the oils are selected to have and provide higher levels of medium chain triglycerides. While not proven and not universally accepted, it is believed by many in the art that the presence of medium chain triglycerides beneficially enhances the bioavailability of calcium phosphate salts possibly by increasing calcium absorption. A suitable oil that provides high levels of such medium chain triglycerides is canola oil.

In preferred embodiments, the fat component can additionally include lecithin and other emulsifiers, e.g., acetylated mono-glycerides, if desired.

In still another variation, the present products can further comprise about 0.15 to 50% inulin, preferably about 0.5% to 20%. Inulin or equally suitable like fructooligosaccharides ("FOS") ingredients provide the benefits of soluble fiber without the adverse organoleptic or allergen features of such other soluble fiber materials such as oat bran, Psyllium, beta glucan, and guar gum. Moreover, it is believed that inulin and/or FOS materials facilitate the absorption of calcium when provided in the form of calcium phosphate salts. It is an advantage herein that inulin and FOS materials behave in a manner similar to sugars which allows for ease of use and incorporation. Thus, inulin can conveniently be added to fruit and sugars blend 12. Also, inulin's bland flavor makes inulin particularly suitable for use in children's products since children are notoriously sensitive to off flavors. Moreover, it is believed that there is a synergistic effect when both inulin and medium chain triglycerides are both present on the absorption of calcium from calcium phosphate salts.

Optionally, the present nutrient clusters can further additionally include effective amounts of a flavor(s). Conveniently, the flavor(s) can be dispersed and evenly applied as part of the binder.

The nutrient clusters are formed into suitably sized and shaped pieces. In a preferred embodiment, the pieces are bite sized ranging from about 0.5 to 10 g, preferably about 1 to 8 g each. The pieces can, if desired, be imparted with a particular shape such as an animal or vehicle. The pieces can be of all one color or portions can be of additional colors.

These nutrient clusters are unusually nutritious from a weight standpoint. As described, a single 15 gram serving may contain greater than 1.5 grams of dietary fiber, greater than 3 grams of protein, the majority of which may be soy protein, and 100% of the recommended daily intake of a variety of vitamins and minerals. Not only does this high nutritional density allow this cluster to be used as a nutritional "additive" to RTE cereals, but it allows it to serve as a nutritious snack or supplement with a relatively small impact on an individuals total caloric intake. A typical 15 gram "serving" of these clusters has less than 60 calories.

RTE Cereal Blends

The nutrient clusters can be used and consumed themselves as an RTE cereal or cereal based snack or as a topical additive for other food products, e.g., ice cream, yogurt or admixed therewith to make a nutritionally fortified frozen dairy treat. In still other variations, the clusters can be added to dry mixes for baked goods. In still another uses, the clusters can be added together with dried seasoned bread pieces for stuffing mixes or as salad toppings. The clusters can be combined with other snack ingredients e.g., pretzels, for including into snack mixes.

However, the nutrient clusters find particular suitability for use for admixture with conventional RTE cereals to provide nutritionally fortified blended RTE cereal products. Any conventional RTE cereal whether or not nutritionally fortified can be used as the RTE cereal base of such blended RTE cereal products. Such RTE cereal base can be in the form of flakes, shreds, biscuits, puffed pieces and mixtures thereof. The RTE cereal base can be topically sweetened such as with a sugar coating. Especially preferred for use herein are RTE cereal bases fabricated from cooked cereal doughs comprising about 1% to 40% of the RTE cereal base of a soy ingredient selected from the group consisting of soy flour, soy protein, soy protein isolate, and mixtures thereof. Good results are obtained when the weight ratio of nutrient clusters to RTE cereal base ranges from about 1:50 to about 50:1, preferably about 1:10 to about 2:1 and for best results about 1:4 to 1:1.

It is an advantage that these highly fortified blended RTE cereal products are highly reminiscent in taste, flavor and appearance of familiar unfortified RTE cereal products. As such, the consumer is not asked to consume a distinctive "medicinal" product.

Additional Particulates

If desired, the nutritionally fortified blended RTE cereal products can further comprise additional particulates intended to enhance the flavor and appeal of the RTE cereal products. Such supplemental additives can include dried fruit pieces (e.g. raisins), nuts, candies or confections, (e.g., dried marshmallow pieces) and mixtures thereof.

Typically such supplemental particulates are characterized by a larger particles size that the particulates from which the nutrient clusters are prepared. The supplemental particulates generally are characterized by piece counts ranging from about 300 to 1,500 per pound. If present such supplemental particulates can be present in the fortified RTE cereal products in a weight ratio of supplemental particle to cereal base ranging broadly from about 1:10 to about 1:1, preferably about 1:5 to 1:1 and for best results about 1:3 to 1:2. It will be appreciated that such supplemental particulates will generally be smaller in size than the present nutrient clusters.

In one highly preferred embodiment, the RTE cereal blends comprise "Null clusters" or unfortified clusters having a similar shape, size and formulation as the present nutrient clusters except for the absence of the added fortifiers. Such "null clusters" find surprising usefulness in techniques and methods for providing customized cereal products in response to individual consumer orders. As noted above, a consumer might first order 100% USRDA of all essential vitamins and minerals in 30 g of blended RTE cereal product that includes 10 g or 30% nutrient clusters. In a second or later order, the consumer might request the same level of fortification but in a 50 g blended RTE cereal products sized portion. The consumer will then expect the same level, 30%, of clusters. Rather than remake the nutrient clusters so that 100% USRDA of all essential vitamins and minerals are provided in 15 g of clusters, the same batch or formula of 10 g of fortified nutrient clusters can be admixed with 5 g of "null clusters" to provide the requested nutritional, taste and appearance profile. Employment of the combination of nutrient clusters with equivalent null clusters thus can greatly simplify the provision of to-order cereals having customized nutrient profiles.

If present, such null clusters can be present in a weight ratio to nutrient clusters ranging from about 1:20 to about 1:1, preferably about 1:10 to about 1:3.

METHOD OF PREPARATION

In its method aspect, the present invention provides methods for preparing the present fortified nutrient clusters. The present methods first essentially comprise the step of (A) coating the particulates with a quantity of liquid binder to form sticky binder coated particulates. The particulates include dried cooked cereal grain pieces, texturized vegetable protein, dried cooked cereal dough pieces, nut meat pieces, dried fruit, legumes and mixtures thereof. The present methods further essentially comprise the step of (B) coating the binder coated particulates of with a dry nutrient powder blend to form a nutrient cluster in the form of pieces each weighing about 0.5 to 5 g (dry weight basis). The present methods further essentially comprise the step of (C) curing the nutrient clusters to solidify the liquid binder and thus harden the cluster to form dried solid nutrient clusters having a moisture content of about 4% to 10%.

The present methods can be conveniently practiced in conventional food processing equipment. For example, conventional enrobers used to provide a sugar coating syrup to R-T-E cereals can be employed. In another variation, equipment typically used in sugar panning processes can be used.

The methods can be practiced in a continuous process, batch or semi-continuous processes. Also, the methods can be practiced by performing Step (A) all at once and thereafter practicing step (B) all at once. However, in a preferred variation, a portion of the binder is added to the particulates and coated with that portion of the binder to form the sticky binder coated particulates. Next, a portion of the nutrient powder blend is added to the sticky binder coated particulates and mixed to adhere the powdered nutrient blend to the sticky binder coated particles. Thereafter, more particulates can be added together with more binder to enlarge the size of the clusters being formed. More nutrient powder is then added and the tumbling action is continued until nutrient cluster pieces of the desired size are obtained. The method can be practiced to remove the larger sized pieces within the recited size range of 0.5 to 5 g each leaving the smaller sized pieces. The smaller size pieces can remain in the enrober and Steps (A) and (B) can alternatively and repetitively practiced to produce further aggregate and enlarge the size of the nutrient clusters.

In preferred practices, a dry preblend of the various particulates is made. Also in preferred practice, a dry preblend of the powdered nutrient blend is made.

In preferred embodiments, the binder comprises a sugar syrup of about 90° Brix to about 95° Brix. The sugar syrup is heated to 76.6 to 87.7° C. (170 to 190° F.), preferably 79.4 to 85° C. (175 to 185° F.), and for best results about 82.2° C. (180° F.) before being added to the particulates admixture and coating step.

In certain preferred embodiments, especially for batch or semi-continuous process, step (A) can comprise the sub-step of providing an aqueous premix of dissolved sugar ingredients (including any fruit ingredients), bulking agents, preservatives, buffers, inulin and/or other FOS materials and optionally all or a portion of any gelling agents. This aqueous premix can be heated or cooked such as with steam 13 to temperatures 200–350° F. (step 30) Such units as steam injection with back pressure valve or a direct cook system can be employed to reach such temperatures.

Step (A) can also include the substep of providing fat in liquid form optionally admixed with an emulsifier. For example, fat that is normally solid at room temperature can be heated to above its melting temperature to provide a fluid or liquid fat. Good results are obtained when the fat is heated to about 120° to 160° F. The liquid fat can be admixed with an emulsifier such as lecithin. Good results are obtained when the ratio of fat to lecithin (or other emulsifiers) ranges from about 5:1 to about 15:1, preferably about 10:1. The fat can also be mixed with or substituted with an oil especially canola oil which is a good source of medium chain triglycerides.

Step (A) can further include a substep of providing an insoluble calcium carbonate and/or phosphate salt slurry by mixing the calcium phosphate with a non aqueous liquid carrier, preferably all or at least a portion of the fat. If a fat that is normally solid at room temperature is selected for use, then the fat is first heated above its melting point and maintained at temperatures hot enough to maintain as a fluid even after the calcium phosphate salt is added. If an oil is selected then, then the oil can be but is not necessarily heated. If desired, a portion of the fat can be added separately. The fat carrier can be and preferably does contain an emulsifier to facilitate the dispersion. Also, the fat provides a convenient means for evenly adding any included emulsifier.

Care should be taken when using a hot sugar syrup binder of a liquid fat binder that the binder coated particulates mixture and powdered nutrient blend is maintained below the temperatures at which the heat sensitive vitamins begin to degrade. Good results are obtained when in steps (A) and (B) the mixtures are maintained at temperatures ranging from about 100° F. to about 160° F., preferably about 120° F. to about 140° F.

It will be appreciated that these substeps can be performed simultaneously as well as in various order combinations.

The pieces so formed can range in size from about 0.0.3 to 10 g, preferably about 1 to 5 g. Prior to the curing step (C), the aggregated nutrient clusters are warm (100 to 160° F.) plastic and deformable. In preferred embodiments, the soft, pliable or plastic nutrient cluster pieces are formed into shapes having an ornamental configuration such as geometric shapes or shapes of animal or vehicles.

The curing step is practiced to transform the soft cluster pieces into hardened pieces by solidifying the binder. In one variation, the cluster pieces are dried such as forced air drying to dry the pieces to about 2% to 19% moisture. Such drying can remove any moisture added in the liquid binder such as when a sugar syrup is used as the binder. In another variation, such as when a melted fat is used in whole or in part as the binder, the curing step can involve cooling to room temperatures below the melting point of the heated binder fat to allow the fat to solidify and thereby form the hardened clusters.

The individually shaped pieces can then be subsequently packaged in conventional manner. Especially useful are moisture sealed pouches fabricated from flexible film packaging impermeable flexible holding about 5 to 25 individual pieces collectively weighing about 25 to 50 g.

From the foregoing description, it can be appreciated that the present nutrient clusters are heterogeneous in appearance and texture. Thus while being characterized herein as aggregates or clusters, the physical form of the present pieces are to be distinguished from pieces of fortified cereal bars. Also, the present nutrient cluster pieces are distinguishable from substantially homogeneous products such as prilled or agglomerated pieces such as conventional vitamin tablets of various shapes and sizes.

The finished nutrient cluster products are of both good flavor and eating quality. The products also provide exceptional nutritional properties in terms of sources vitamins, minerals and macronutrients of such as calcium. The food products so formed are characterized by being nutritious, wholesome snacks and being fortified with high levels of calcium. The nutrient cluster products can, for example, be used as a substitute for disliked conventional vitamin pills for children.

In further variations of the present invention, the nutrient clusters can be admixed with an R-T-E cereal base to form blended R-T-E cereal products. Preferably for sugar coated blended R-T-E cereal products, the cereal base is sugar coated prior to admixture with the nutrient clusters. In still other variations, the blended R-T-E cereal products can be further blended or admixed with conventional cereal particulates such as dried fruit pieces, nuts, candies or confections and to form blended cereal products that are useful as R-T-E cereal products or grain based snacks. For those products intended for use as grain based snacks, the present preparation methods can further optionally comprise a step of adding a topical seasoning (e.g., salt, fat, cheese, herbs and spices, etc.) to the blended cereal products.

The blended R-T-E cereal products can be conventionally packaged and distributed to provide highly fortified yet organoleptically appealing cereal products.

In a preferred variation, individually measured portions of about 20 to 50 g of blended cereal product are packaged in separate containers such as flexible film pouches. The quantity of cereal base and nutrient clusters as well as formulation of the cluster can be closely controlled such as to provide 100% USRDA of desired vitamins, minerals in a controlled portion or amount of blended product. Such portion control is particularly suitable for use in dietary calorie intake control regimens such as in hospital, nursing home or weight reduction diets. Moreover, the blended products can be formulated to additionally provided nutrient profiles intended to be prophalactically useful or even therapeutically useful against various disease conditions such as heat disease, diabetes, osteoporosis and the like.

In another variation, "null clusters' can be similarly prepared but formulated to be empty of the powdered nutrient blend. A portion of these null clusters can be added to closely control the fortification levels of various portions of blended cereal product and yet maintain the desired percentage (e.g., 30%) of added clusters. Such usage of null clusters finds particular suitability for use in connection with the to-order preparation of customized nutritionally fortified R-T-E cereal products in response to specific consumer order information.

What is claimed is:

1. A food product, comprising:
   (1) a ready-to-eat cereal base; and
   (2) a plurality of nutrient clusters admixed with the ready-to-eat cereal base to form a blended product, wherein each nutrient cluster comprises:
      A. about 20% to 85% by weight of the cluster of a plurality of binder coated particulates selected from the group consisting of dried cooked cereal grain pieces, texturized vegetable protein, dried cooked cereal dough pieces, nut meat pieces, dried fruit, legumes, fruit pastes and mixtures thereof;
      B. about 0.1% to 40% by weight of a nutrient powder blend comprising at least one pre-encapsulated micronutrient; and
      C. about 15% to 40% by weight of a binder, wherein the nutrient cluster weighs from about 0.3 to 5 g and has a moisture content of about 2% to 10% by weight.

2. The food product of claim 1, wherein each particulate ranges from about 0.8 to 8 mm.

3. The food product of claim 1, wherein each nutrient cluster weighs about 0.3 to 1 g.

4. The food product of claim 1, wherein the nutrient powder blend has a particle size of less than 500 microns.

5. The food product of claim 4, wherein the plurality of particulates comprise puffed dried cooked cereal dough pieces having a density of about 0.1 to 0.5 g/cc.

6. The food product of claim 1, wherein the plurality of particulates have a piece count ranging from about 500 to 10,000 per pound.

7. The food product of claim 1, wherein the nutrient powder blend comprises at least one vitamin and at least one mineral.

8. The food product of claim 7, wherein the at least one mineral comprises at least one member selected from the group consisting of calcium, copper, iron, selenium, magnesium, manganese, zinc, and mixtures thereof.

9. The food product according to claim 8, wherein the at least one mineral is selected from the group consisting of calcium carbonate, calcium phosphate salts, and mixtures thereof.

10. The food product of claim 9, wherein at least a portion of the calcium is encapsulated with inulin.

11. The food product of claim 10, wherein the calcium is supplied by an insoluble material selected from the group consisting of monobasic, dibasic or tribasic calcium phosphate salts, their hydrates and mixtures thereof.

12. The food product of claim 1, wherein the nutrient blend powder comprises a plurality of vitamins.

13. The food product of claim 12, wherein all the vitamins are pre-encapsulated.

14. The food product of claim 12, wherein the vitamins comprise at least one member selected from the group consisting of vitamin A, vitamin E, vitamin D, folic acid, biotin, vitamin $B_1$, vitamin $B_2$, vitamin $B_3$, vitamin $B_6$, vitamin $B_{12}$, pantothenic acid, niacin, thiamin, copper, and mixtures thereof.

15. The food product of claim 1, wherein the at least one pre-encapsulated micronutrient is at least one vitamin encapsulated in a fat, gelatin, starch or sugar matrix.

16. The food product of claim 1, wherein at least a portion of the plurality of particulates comprises at least one member of the group selected from soy proteins, soluble fiber, and mixtures thereof.

17. The food product of claim 16, wherein at least one nutrient cluster has a protein content of about 1% to 42% by weight.

18. The food product of claim 1, wherein the binder comprises about 0.1% to about 10% by weight of at least one nutrient cluster of fructooligosaccharide.

19. The food product of claim 18, wherein at least a portion of the fructooligosaccharide is inulin.

20. The food product of claim 1, wherein the nutrient clusters have a calcium content of about 0.5% to 20% by weight.

21. The food product according to claim 1 having 100% USDRA of all essential vitamins and minerals in less than about 5 to 15 g of nutrient clusters.

22. The food product of claim 1, wherein the binder comprises a fat, at least a portion of which is a medium chain length triglyceride.

23. The food product of claim 22, wherein at least a portion of the medium chain length triglyceride is supplied by canola oil.

24. The food product of claim 1, wherein the weight ratio of the plurality of nutrient clusters to the ready-to-eat cereal base ranges from about 1:50 to about 50:1.

25. The food product of claim 1, wherein the cereal base is selected from the group consisting of shreds, flakes, biscuits, puffed pieces, and mixtures thereof.

26. The food product of claim 1, wherein the food product further comprises supplemental particulates selected from the group consisting of dried fruit pieces, nuts, candies, confections, and mixtures thereof.

27. The food product of claim 1, further comprising null clusters in a weight ratio to the nutrient clusters ranging from about 1:20 to about 1:1.

28. The food product of claim 1, wherein the plurality of particulates in the nutrient clusters comprise (1) dried cooked cereal grain pieces or dried cooked cereal dough pieces, and (2) at least one additional particulate selected from the group consisting of texturized vegetable protein, nut meat pieces, dried fruit, legumes, and fruit pastes.

29. The food product of claim 1, wherein the nutrient powder blend comprises a micronutrient selected from the group consisting of prebiotics, probiotics, isoflavones, phytochemicals, and mixtures thereof.

30. The food product of claim 29, wherein the nutrient powder blend comprises a prebiotic or a probiotic.

31. The food product of claim 1, wherein the at least one pre-encapsulated micronutrient comprises a prebiotic.

32. The food product of claim 1, wherein the nutrient powder blend comprises sufficient amounts of an insoluble fiber to provide the nutrient cluster with an insoluble fiber content of about 0.5% to 20% by weight.

33. The food product of claim 1, wherein the nutrient powder blend comprises sufficient amounts of a soluble fiber to provide the nutrient cluster with a soluble fiber content of about 0.5% to 20% by weight.

34. A method for preparing a food product, comprising:
(A) coating a plurality of particulates with a quantity of liquid binder to form sticky binder-coated particulates, said particulates being selected from the group consisting of dried cooked cereal grain pieces, texturized vegetable protein, dried cooked cereal dough pieces, nut meat pieces, dried fruit, legumes, fruit pastes and mixtures thereof;
(B) coating the binder-coated particulates of step (A) with a dry nutrient powder blend comprising at least one pre-encapsulated micronutrient, thereby forming a nutrient cluster weighing about 0.3 to 5 g on a dry weight basis;
(C) curing the nutrient cluster to solidify the liquid binder to form a dried solid nutrient cluster having a moisture content of about 2% to 10% by weight; and
(D) admixing a plurality of nutrient clusters with a ready-to-eat cereal base to form a blended product.

35. The method of claim 34, wherein said plurality of particulates each range in size from about 0.8 to 8 mm.

36. The method of claim 34, wherein the nutrient cluster has a weight of about 0.3 to 1 g.

37. The method of claim 34, wherein the nutrient powder blend has a particle size of less than 500 microns.

38. The method of claim 34, wherein the nutrient powder blend has a particle size ranging from about 5 to 250 microns.

39. The method of claim 34, wherein at least a portion of the plurality of particulates has a piece count of about 500 to 10,000 per pound.

40. The method of claim 1, wherein at least 50% of the plurality of particulates by weight comprise puffed cooked cereal doughs having a density of about 0.1 to 0.4 g/cc.

41. The method of claim 1, wherein the nutrient powder blend comprises at least one micronutrient and at least one macronutrient.

42. The method of claim 1, wherein Step (A) is practiced in its entirety before step (B).

43. The method of claim 1, wherein in step (A) only a portion of the binder is applied to the plurality of particulates and wherein in step (B) only a portion of the nutrient powder blend is applied to the sticky binder-coated particulates and alternately repeating step (A) and step (B).

44. The method of claim 1, wherein the nutrient powder blend includes at least one vitamin and at least one mineral.

45. The method of claim 44, wherein the at least one mineral comprises at least one member selected from the group consisting of calcium, copper, iron, selenium, magnesium, manganese, zinc, and mixtures thereof.

46. The method of claim 45, wherein at least a portion of the calcium is supplied by a member selected from the group consisting of calcium carbonate, calcium phosphate salts, and mixtures thereof.

47. The method of claim 1, wherein the nutrient powder blend includes a plurality of vitamins.

48. The method of claim 1, wherein the at least one pre-encapsulated micronutrient is at least one vitamin encapsulated in a fat, gelatin, starch, or sugar matrix.

49. The method of claim 1, wherein at least a portion of the plurality of particulates comprises at least one member of the group selected from soy protein, soluble fiber, and mixtures thereof.

50. The method of claim 49, wherein at least one nutrient cluster has a protein content of about 1% to 42% by weight.

51. The method of claim 34, wherein the binder comprises about 0.1% to about 50% by weight of the cluster of a fructooligosaccharide.

52. The method of claim 51, wherein at least a portion of the fructooligosaccharide is inulin.

53. The method of claim 34, wherein the nutrient powder blend comprises sufficient amounts of a calcium material to provide the cluster with a calcium content of about 0.5% to 15% by weight.

54. The method of claim 53, wherein at least a portion of the calcium is supplied by a member selected from the group consisting of calcium carbonate, calcium phosphate salts, and mixtures thereof.

55. The method of claim 34, wherein the nutrient powder blend comprises a vitamin which is at least one member selected from the group consisting of vitamin A, vitamin E, vitamin D, folic acid, Biotin, vitamin $B_1$, vitamin $B_2$, vitamin $B_3$, vitamin $B_6$, vitamin $B_{12}$, pantothenic acid, niacin, thiamin, copper, and mixtures thereof.

56. The method of claim 34, wherein the binder comprises a fat, at least a portion of which is a medium chain triglyceride.

57. The method of claim 56, wherein at least a portion of the medium chain triglyceride is supplied by canola oil.

58. The method of claim 34, wherein the nutrient powder blend comprises sufficient amounts of an insoluble fiber to provide the cluster with a insoluble fiber content of about 0.5% to 20% by weight.

59. The method of claim 34, wherein the nutrient powder blend comprises sufficient amounts of a soluble fiber to provide the cluster with a soluble fiber content of about 0.5% to 20% by weight.

* * * * *